United States Patent
Cuijpers et al.

(10) Patent No.: US 6,857,010 B1
(45) Date of Patent: Feb. 15, 2005

(54) SYSTEM FOR DISPLAY INFORMATION CONTENT ON A SCREEN HAVING A LIMITED VIEWING AREA BY USING STATISTICS PROVIDED BY A USER HISTORY FILE TO DISPLAY IN VISIBLE PORTION OF THE SCREEN A USER-CONTROLLABLE CURSOR ON A MOST FREQUENTLY PREVIOUSLY SELECTED MATCHING HYPERLINK

(75) Inventors: Maurice Cuijpers, San Jose, CA (US); Jan Van Ee, Cupertino, CA (US); Roel Foppema, Menlo Park, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 617 days.

(21) Appl. No.: 09/706,099

(22) Filed: Nov. 3, 2000

(51) Int. Cl.[7] .............................................. G06F 15/16
(52) U.S. Cl. ...................................................... 709/219
(58) Field of Search ................................ 709/200, 203, 709/217, 219; 707/10; 345/738, 786

(56) References Cited

U.S. PATENT DOCUMENTS

| | | | |
|---|---|---|---|
| 6,209,009 B1 * | 3/2001 | Schwartz et al. ............ 715/517 |
| 6,222,541 B1 * | 4/2001 | Bates et al. ................... 345/786 |
| 6,330,596 B1 * | 12/2001 | Stuckman et al. ........... 709/219 |
| 6,392,668 B1 * | 5/2002 | Murray ......................... 345/738 |
| 6,615,212 B1 * | 9/2003 | Dutta et al. .................... 707/10 |
| 6,674,453 B1 * | 1/2004 | Schilit et al. ................. 345/810 |
| 2001/0020242 A1 * | 9/2001 | Gupta et al. ................ 707/501.1 |
| 2001/0034814 A1 * | 10/2001 | Rosenzweig ................. 711/118 |
| 2002/0069100 A1 * | 6/2002 | Arberman ..................... 705/10 |
| 2002/0099812 A1 * | 7/2002 | Davis et al. .................. 709/224 |

FOREIGN PATENT DOCUMENTS

| | | |
|---|---|---|
| EP | 0944009 A2 | 9/1999 |
| WO | WO 98 50862 | 11/1998 |
| WO | 0025239 | 5/2000 |

* cited by examiner

*Primary Examiner*—Patrice Winder
*Assistant Examiner*—Oanh Duong
(74) *Attorney, Agent, or Firm*—Michael J. Ure

(57) ABSTRACT

A method for displaying information content enabling user-friendly navigation through content. When the user accesses information content, a cursor is initially positioned such as to indicate an element of information content that was determined from a user's profile. An Internet browser positions the cursor, upon access of a web page, for indicating the hyperlink most frequently requested by the user in given past period.

2 Claims, 2 Drawing Sheets

SYSTEM FOR DISPLAY INFORMATION CONTENT ON A SCREEN HAVING A LIMITED VIEWING AREA BY USING STATISTICS PROVIDED BY A USER HISTORY FILE TO DISPLAY IN VISIBLE PORTION OF THE SCREEN A USER-CONTROLLABLE CURSOR ON A MOST FREQUENTLY PREVIOUSLY SELECTED MATCHING HYPERLINK

FIELD OF THE INVENTION

The invention relates to a method to display information content.

The invention further relates to an apparatus to display information content.

The invention may be used when viewing HTML pages using an Internet browser.

BACKGROUND ART

It is common for users to view interactive information content available over a communication network. The most prevalent example involves the access of HTML (Hyper-Text Mark-up Language) files over the WWW (World Wide Web) that a web browser retrieves and renders as user-readable information content. Typically, due to size limitations of the screen or the window being used to view information content, only a portion of information content can be displayed at an instant. The content remainder may be viewed by scrolling which causes different content portions to be displayed.

It is frequently the case that a user is only interested in a particular portion of a page. Therefore when the user accesses the page, he/she may have to scroll down to the particular portion each time the page is accessed.

European patent application EP0944009A2, incorporated herein by reference, provides a method for bookmarking information content aiming to solve one or more of the above identified disadvantages. In such a method, when a bookmark of a page is created, a locator element is stored which identifies a particular subset of the page. When the bookmark is subsequently accessed, the updated particular subset is displayed.

SUMMARY OF THE INVENTION

A method such as disclosed in EP0944009A2 does not address difficulties encountered when moving into information content is only done by shifting a cursor from a first position on the screen to a second adjacent position on the screen. The second position may be on the left, on the right, above or below the first position. Such a known method does not mention how to place a cursor within the information content when the information content is accessed.

For example, a user may find burdensome to view a WWW page using a TV screen since a TV screen may not permit to use a mouse. Moving on the page and scrolling down on the page is often performed by moving on the screen a rectangle of variable size, the cursor, using array buttons on a remote control. The cursor is, for example, moved from one hyperlink to an adjacent one. An active element such as an hyperlink is selected or activated by first positioning the cursor in a way that it indicates the hyperlink. The element is then selected by pressing a validation button on the remote control. Scrolling-down may also be performed by pressing a "page-down" button of the remote control. Thus, when the user often wants to select the same element of the page, the user will have to move the cursor through most of the preceding elements or hyperlinks in the page before reaching the actual element. Repeatedly scrolling down to this element of information content may therefore be slow and burdensome.

It is an object of the invention to provide an efficient alternate method for assisting a user in navigating through information content.

It is another object of the invention to provide a user-friendly method for displaying information content.

To this end, a method of the invention comprises:

determining a profile of a user;

determining, from the profile, an element among a plurality of elements of an information content;

displaying a portion of the information content;

indicating the element of the information content.

The information content comprises a plurality of elements and some of these elements are user-selectable. Among these elements, a specific element that matches the previously determined user-profile is determined. A portion of the information content is displayed and the determined element is indicated on the information content. The indicated profile-specific element is not necessarily displayed and can be part of the information content that is off-sight. An advantage of the invention is user-friendliness.

In an embodiment of the invention, a portion of the information content comprising the element is initially displayed.

In this embodiment, the indicated element is also displayed upon access to the information content for example. When accessing the information content, the user is initially provided with a portion of the information content comprising the specific element according to his/her profile. For example, a web page comprises an hyperlink that matches the user's profile. When the user accesses that web page, a portion of the web page comprising the hyperlink is automatically displayed. In addition, a cursor indicates the hyperlink, e.g. the hyperlink is highlighted. This is a user-customized method of displaying information content.

In an embodiment of the invention, the element is a user-selectable element most frequently selected by the user during a given period.

In this embodiment, the indicated element is the one that the user most frequently selected during his/her previous access to the information content for a given time period. Therefrom, the element is the one that the user is most likely to select. An advantage of the invention is to provide an adaptive method based on the past behavior of the user.

The invention also relates to a browser or a plug-in to be added to a browser for carrying out a method of the invention.

BRIEF DESCRIPTION OF THE DRAWINGS

The invention is explained in further detail, by way of example, and with reference to the accompanying drawing wherein.

Elements within the drawing having similar or corresponding features are identified by like reference numerals.

PREFERRED EMBODIMENT

As used herein, "indicating" is possibly done using a cursor which is a position indicator within information content. The cursor may be an arrow pointing to an element of information content. Alternatively the cursor is a rectangle surrounding a portion of information content. The user uses the cursor to move in information content and to select elements of information content. Indicating may also be performed as the highlighting of an element of information content. In the following, a cursor is used to indicate elements of information content but any other way of indicating an element may also be used such as highlighting.

In a method of the invention information content may be a web page. As used herein a "web page" is an individual HTML file with its own Web address, the URL. A "URL" (Uniform Resource Locator) is the address of a file accessible on the Internet. Using the WWW's application protocol HTTP, the resource can be an HTML page, an image file or a program such as a Java applet for example.

A "browser" indicates an application program providing access to all or non-restricted information on the WWW. A web browser uses the Hyper Text Transfer Protocol (HTTP) to make requests of web servers throughout the Internet on behalf of the user.

A "plug-in" is a hardware or software module that adds specific feature or service to a larger system such as a web browser. A plug-in application can be installed and used as part of a web browser. A plug-in application is automatically recognized by the browser.

As used herein an "hyperlink" or "hypertext link" is an organization of information for connecting one information to another information.

Figure 1:
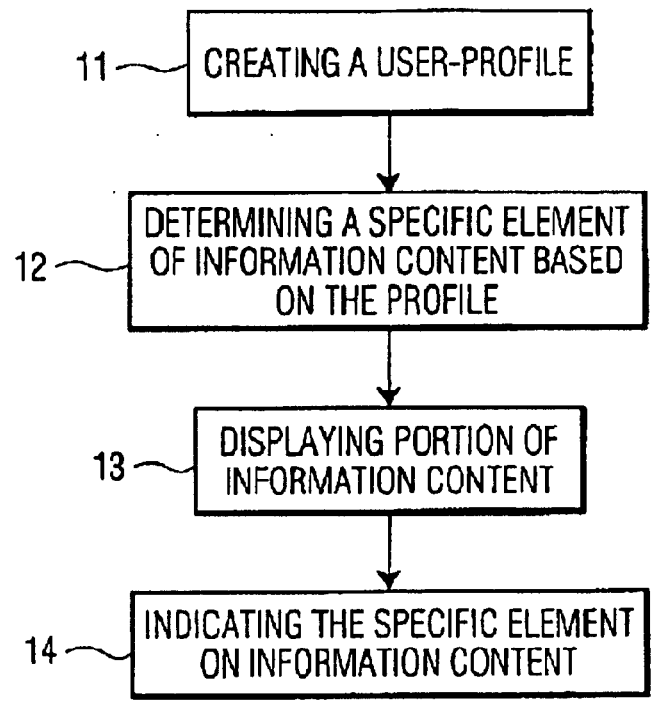
FIG. 1 is a flowchart diagram of a method of the invention.

FIG. 1 is a flowchart diagram of a method of the invention for displaying information content C to a user. Information content C may be accessed over a communication network. Information content C may be a HTML page available on the WWW. A first step 11 comprises creating a profile of the user. The profile may comprise preferences of the user, interests of the user, members of the household of the user, user's personal information, habits of the user, etc. The profile may also be built up from previous access of the user to information content C or other information contents over the communication network. The profile can be built up from the types of information contents that the user has accessed and the subjects covered.

Information content C may contain interactive or active elements that the user can select and activate. An HTML page on the Internet may include hyperlinks that allow delivery of other HTML pages or other files such as Java applets or GIF files. Such hyperlinks are elements that the user can select and activate. The profile may then also depend on which elements of information content C the user has selected. The profile may also include statistics and the number of times the user has selected a given element of information content C.

In a step 12, a specific element E of information content C is determined from the defined profile. For example, the specific element E may be the one that the user has most frequently selected for a given period in the past. The specific element E may also be one that matches the user's interests.

A step 13 comprises displaying a portion of information content C or entire information content C. Only a portion of information content C may be displayed due to the limiting size of the display window used by the user to view information content C.

Figure 2:
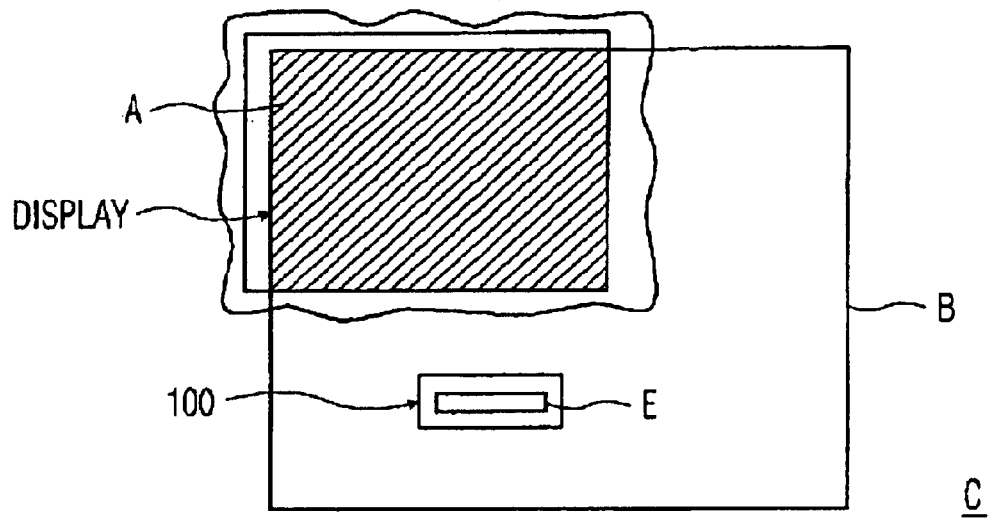
FIG. 2 depicts information content and a displayed portion.

In a step 14, the specific element E determined in step 12 is indicated on information content C. For example, a cursor is positioned in information content C for indicating the specific element E. The specific element E and the cursor may not necessarily be displayed and may be placed in a portion of information content C that is not displayed as shown in FIG. 2. FIG. 2 shows information content C and what portion of information content C is initially displayed upon access to content C. A portion A of information content C is displayed and a portion B of information content C is not displayed and is off-sight. A profile of the user has been determined and according to a method of the invention, a specific element E has been determined as matching the profile. This element E is indicated by a rectangle 100 surrounding it. In this embodiment the element E belongs to the portion B of the information content C that is not initially displayed. In another embodiment, at least a portion of information content C is displayed starting at the specific element E, e.g. the specific element E is located on the first line of the window used to view information content C. When only a portion of information content C is displayed, the remainder may be viewed by moving the cursor left, right, down or up on information content C.

Figure 3:
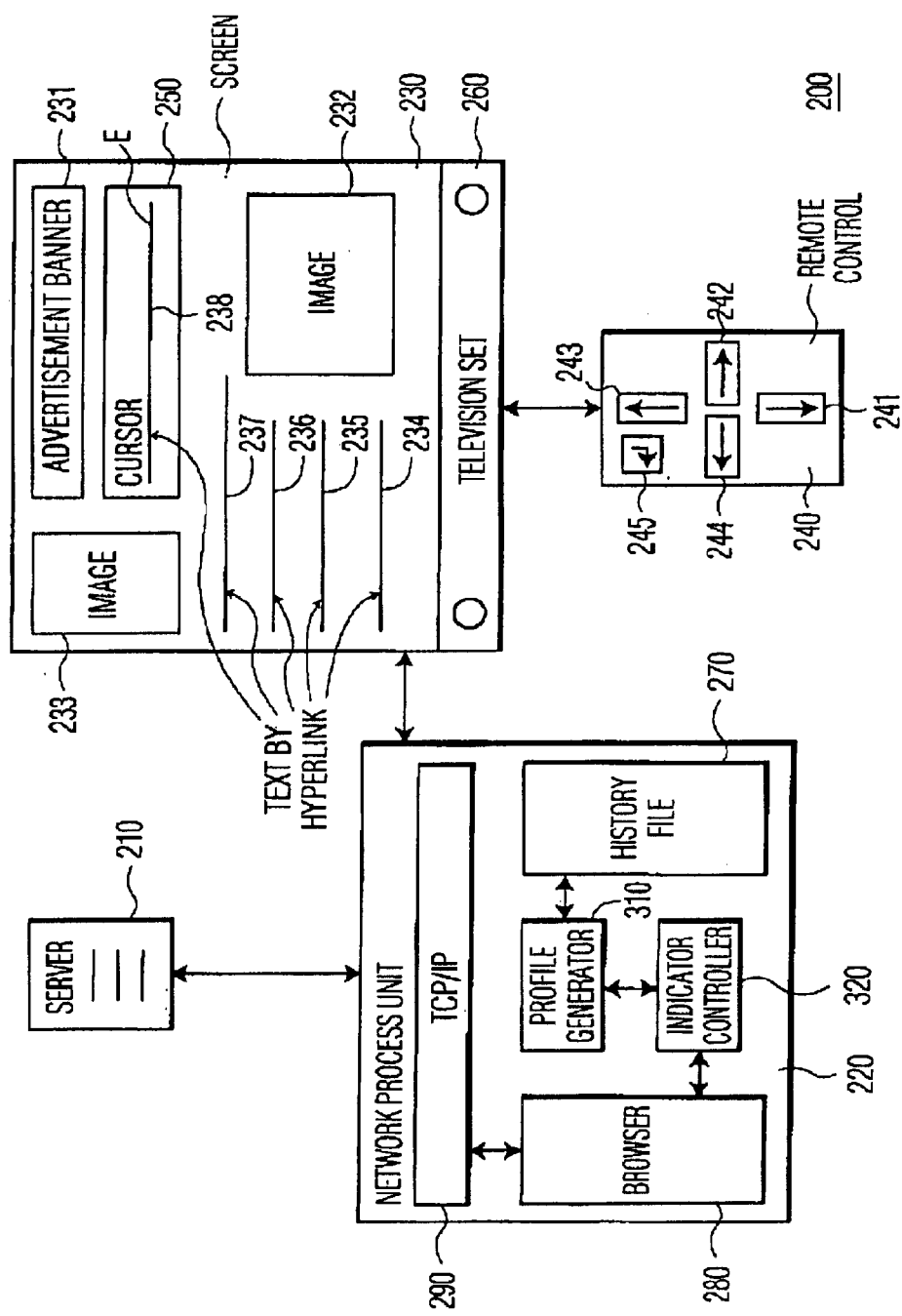
FIG. 3 is a block diagram of a system for displaying information content according to the invention.

FIG. 3 is a system 200 for displaying information content C. The system 200 comprises a remote server 210 of an internet service provider hosting information content C. The system further comprises a network access unit 220 for accessing the remote server 210, transmitting requests from a web browser 280 and delivering information content C. The unit 220 may be a set-top box. A set-top box is in this case a device that enables a television set to become a user interface to the Internet. The set-top box 220 contains the Web browser 280 and the Internet's main program 290, TCP/IP (Transmission Control Protocol/Internet Protocol) for example.

The unit 220 is connected to a television set 260 and the information content C is displayed to the user using a television display 230 of the television set 260.

In FIG. 3, the display 230 is currently displaying a portion of information content C. Information content C contains at least elements 231, 232, 233, 234, 235, 236, 237 and 238. The elements 231–238 are 8 hyperlinks: two images 232 and 233, an advertisement banner 231, five text hyperlinks 234, 235, 236, 237 and 238. These elements 231–238 are active elements, i.e. these elements 231–238 may be activated by the user and each element 231–238 contains a URL pointing to a respective remote file. When one of the elements 231–238 is selected, the corresponding respective file is automatically delivered and rendered. Information content C may also comprise additional active or non-active elements.

The user navigates in information content C using a cursor 250. In this embodiment, the cursor 250 is a rectangle of variable size surrounding one element of information content C at a time. The cursor 250 can be moved among the elements 231–238 of information content C. The user can move the cursor 250 using array buttons 241, 242, 243 and 244 of a remote control 240. In this embodiment, the cursor 250 can move from a first active element to a second adjacent active element. In FIG. 3, the cursor 250 indicates the hyperlink 238. By pressing the "left array" button 244 the cursor 250 will be moved to the left and will surround the image 233. By pressing the "up" array" button 243, the cursor 250 will be moved up and will surround the advertisement banner 231. By pressing the "right array" button 242, the cursor 250 will move to the right and in this case will go to the next element down in the page and the cursor 250 will surround the hyperlink 237. By pressing the "down array" button 241, the cursor 250 will move down and will surround the hyperlink 237. The remote control 240 may also be provided with an "enter" button 245 that selects the element 232–238 of information content C currently indicated by the cursor 250. For example, when the button 245 is pressed, the hyperlink 238, currently indicated by the cursor 250, is activated and the file pointed by the URL of the hyperlink 238 is downloaded and displayed therefore replacing information content C.

In a method of the invention, the cursor 250 is initially positioned in information content C for indicating the specific element E of information content C determined from the profile of the user. In one embodiment of the invention, the profile of the user is obtained by creating statistics on the past behavior of the user for a given period of time. The profile may be generated by and stored in a profile generator 310. The profile generator 310 may be integrated in the browser 280. The browser 280 generates statistics for each element 231–238 on the number of times the element has been selected during the given period of time. The unit 220 further comprises an indicator controller 320. The controller 320 can also be part of the browser 280. The controller 320 determines the specific element E from the profile determined in the profile generator 310 and initially positions the cursor 250 onto the display 230 when information content C is accessed. In this embodiment, upon access to information content C, the cursor 250 initially indicates the specific element E, selected among the elements 231, . . . or 238, by surrounding it. In this embodiment, the specific element E is the one that has been most frequently selected in the past by the user for the given period of time. Alternatively, the controller 320 may position the cursor 250 for indicating the first element that has been last selected upon a previous access to the web page. A piece of software may be embedded in the browser 280 of the unit 220 to keep track of past selections by the user of elements for information content C therefrom creating a history file 270. The history file 270 may be incorporated in the browser 280.

Further, the profile of the user may also include personal data entered by the user, keywords describing the subject categories of the elements previously selected by the user, etc . . . . For example, the user might be interested in soccer related subjects. Thus, upon access to a web page the controller 320 may initially position the cursor 250 in the page for indicating a specific element E related to soccer, if any exists.

The browser 280 may allow building up respective profiles for different respective users. When using the browser 280, the user is identified and the profile for the identified user is retrieved from the generator 310 and serves as the basis for initially positioning the cursor 250.

The user may also choose him/herself which specific element E to be indicated by the cursor 250 upon access to information content C.

It is also within the scope of the invention to upgrade an existing browser with the functionality of placing the cursor following a method of the invention. This may be done by installing a plug-in in the existing browser. Such a plug-in may be downloaded from the Internet for example. Plug-ins and adding new functionality to a web browser are well-known techniques such as disclosed in the international patent application W00025239, incorporated herein by reference, entitled "A method of controlling an internet browser interface and a controllable user interface". A browser is disclosed that enables an Internet user to display with the browser interface and continuously update information and/or functionality specific to that user.

Besides, the user may choose to inactivate such a functionality of the browser 280 and upon access to a web page, the cursor is initially positioned at the given location in content C, the upper left position for example. Such a method of the invention may also be carried out for certain selected web pages. The browser 280 may display according to a method of the invention web pages that the user most frequently visits or pages that the user had selected in advance.

Such a method may also be relevant to viewing information content using a mobile phone. A mobile phone often provides a limited display and only permits scrolling through information content with arrow keys. The invention may be applied for the display of the menu of functions or submenus offered for the phone. A method of the invention could allow to directly indicate the submenu or the function that the user more often calls for.

It is to be noted that, with respect to the described method, modifications or improvements may be proposed without departing from the scope of the invention. For instance, it is clear that this method may be implemented in several manners, such as by means of wired electronic circuits or, alternatively, by means of a set of instructions stored in a computer-readable medium, said instructions replacing at least a part of said circuits and being executable under the control of a computer or a digital processor in order to carry out the same functions as fulfilled in said replaced circuits.

It is also noted that the word "comprising" in a claim does not exclude the presence of other elements than those listed in this claim.

What is claimed is:

1. A system for displaying information content, comprising:

a user display screen having a limited viewing area and including a user-controllable cursor for screen navigation;

a web browser for displaying on the user display screen a plurality of web content with hyperlinks accessed over a network;

a user history file connected to the web browser and providing for a statistical history of respective hyperlinks which have been previously selected by a particular user; and an indicator controller connected to the web browser to detect when a new webpage is initially being displayed on the user display screen, and having access to the user history file, and being able to scroll said new webpage on the user display screen and control said user-controllable cursor;

wherein:

when the indicator controller detects a new webpage is initially being displayed on the user display screen, it access the user history file to see if any of said hyperlinks match ones in said new webpage, and if there is a match, the indicator controller directs the web browser to display said user-controllable cursor on said matching hyperlink in a visible portion of the user display screen, and the indicator controller uses statistics provided by the user history file to direct the web browser to display in said visible portion of the user display screen said user-controllable cursor on a most frequently previously selected matching one of the hyperlinks.

2. A system for displaying information content, comprising:

a user display screen having a limited viewing area and including a user-controllable cursor for screen navigation;

a web browser for displaying on the user display screen a plurality of web content with hyperlinks accessed over a network;

a user information file connected to the web browser and providing selected data a user contributes in order to prefer the display of particular webpages and hyperlink by the web browser, wherein, the user information file is a user history file providing for statistical history of respective hyperlinks which have been previously selected by a particular user; and an indicator controller connected to the web browser to detect when a new webpage is initially being displayed on the user display screen, and having access to the user information file, and being able to scroll said new webpage on the user display screen and control said user-controllable cursor;

wherein:

when the indicator controller detects a new webpage is initially being displayed on the user display screen, it access the user information file to see if any matches in data occur in said new webpage, and if there is a match, the indicator controller directs the web browser to display said user-controllable cursor on a matching hyperlink in a visible portion of the user display screen, and the indicator controller uses statistics provided by the user history file to direct the web browser to display in said visible portion of the user display screen said user-controllable cursor on a most frequently previously selected matching one of the hyperlinks.

* * * * *